United States Patent [19]
Morrison et al.

[11] Patent Number: 5,914,222
[45] Date of Patent: Jun. 22, 1999

[54] PHOTOGRAPHIC ELEMENT COMPRISING ANTISTATIC LAYER

[75] Inventors: Eric D. Morrison, Minneapolis, Minn.; Paola Puppo, Cogoleto, Italy; Alberto Valsecchi, Vado Ligure, Italy; Elio Martino, Carcare, Italy; William L. Kausch, Cottage Grove, Minn.; Renzo Torterolo, Curiel-Bragno/Cario Montenotte, Italy

[73] Assignee: Minnesota Mining and Manufacturing Company, St. Paul, Minn.

[21] Appl. No.: 08/936,125

[22] Filed: Sep. 24, 1997

Related U.S. Application Data

[63] Continuation of application No. 08/556,471, Nov. 13, 1995, Pat. No. 5,709,985.

[30] Foreign Application Priority Data

Nov. 10, 1994 [EP] European Pat. Off. .............. 94117738

[51] Int. Cl.⁶ .................................................. G03C 1/89
[52] U.S. Cl. .................... 430/510; 430/527; 430/529; 430/530; 252/518
[58] Field of Search .................................. 430/529, 527, 430/530, 510; 428/530, 702; 524/408; 252/518

[56] References Cited

U.S. PATENT DOCUMENTS

| | | |
|---|---|---|
| 2,627,088 | 2/1953 | Alles et al. . |
| 2,698,235 | 12/1954 | Swindells . |
| 2,698,240 | 12/1954 | Alles et al. . |
| 2,763,625 | 9/1956 | Illingsworth et al. . |
| 3,443,950 | 5/1969 | Rawlins . |
| 3,501,301 | 3/1970 | Nadeau et al. . |
| 3,796,680 | 3/1974 | Brockway et al. . |
| 3,797,680 | 3/1974 | Dennis . |
| 4,002,802 | 1/1977 | Bayless et al. . |
| 4,078,935 | 3/1978 | Nakagiri et al. . |
| 4,203,769 | 5/1980 | Guestaux ................................. 430/527 |
| 5,006,451 | 4/1991 | Anderson et al. ....................... 430/527 |
| 5,221,598 | 6/1993 | Anderson et al. ....................... 430/527 |
| 5,284,714 | 2/1994 | Anderson et al. ....................... 430/527 |
| 5,310,640 | 5/1994 | Markin et al. ........................... 430/527 |
| 5,340,676 | 8/1994 | Anderson et al. ....................... 430/527 |
| 5,356,468 | 10/1994 | Havens et al. .......................... 252/519 |
| 5,360,706 | 11/1994 | Anderson et al. ....................... 430/530 |
| 5,366,544 | 11/1994 | Jones et al. .............................. 252/519 |
| 5,366,855 | 11/1994 | Anderson et al. ....................... 430/527 |
| 5,372,985 | 12/1994 | Chang et al. ............................ 503/201 |
| 5,380,584 | 1/1995 | Anderson et al. ....................... 430/903 |
| 5,407,603 | 4/1995 | Morrison ................................. 252/518 |
| 5,427,835 | 6/1995 | Morrison et al. ....................... 430/527 |
| 5,439,785 | 8/1995 | Boston et al. ........................... 430/530 |
| 5,447,832 | 9/1995 | Wang et al. ............................. 430/523 |
| 5,455,153 | 10/1995 | Gardner .................................. 430/530 |
| 5,518,867 | 5/1996 | Anderson et al. ....................... 430/529 |
| 5,709,985 | 1/1998 | Morrison et al. ....................... 430/529 |

FOREIGN PATENT DOCUMENTS

| | | |
|---|---|---|
| 0273605 | 7/1988 | European Pat. Off. . |
| 0495314 | 7/1992 | European Pat. Off. . |
| 0573365 | 12/1993 | European Pat. Off. . |
| 0602713 | 6/1994 | European Pat. Off. . |
| 0616253 | 9/1994 | European Pat. Off. . |
| 2277136 | 1/1976 | France . |
| 6-138580 | 10/1992 | Japan . |
| 2032405 | 6/1979 | United Kingdom . |

OTHER PUBLICATIONS

Emulsion Polymerisation: Theory and Practice, by D.C. Blackley, John Wiley & Sons, pp. 155–250, 1975.

Principles of Polymerization, By George Odian, Wiley–Interscience publication, Radical Chain Polymerization, pp. 201–205, $2^{nd}$ Ed., 1981.

Textbook of Polymer Science, by Fred W. Billmeyer, Jr., Wiley–Interscience Publication, Polymerization Conditions and Polymer Reactions, pp. V, 358–363, $2^{nd}$ Ed., 1971.

Vinylidene Chloride and Poly(Vinylidene Chloride), by Dale S. Bibbs and R.A. Wessling, in Kirk–Othmer Encyclopedia of Chemical Technology, vol. 23, John Wiley & Sons, pp. 784–786, $3^{rd}$ Ed., 1983.

*Primary Examiner*—Richard L. Schilling
*Attorney, Agent, or Firm*—William K. Weimer

[57] ABSTRACT

A photographic element comprising a polymeric film base, a silver halide emulsion layer, and an antistatic layer comprising a colloidal vanadium oxide and a vinyl addition polymer dispersion in a dry weight ratio of from 1:30 to 1:500. The antistatic layer may be present as a backing layer on the side of the base opposite the silver halide emulsion layer, as a subbing layer between the base and the emulsion layer in a single or double side coated photographic element, and/or as a subbing layer between the base and a different backing layer. No barrier layer is used over the antistatic layer.

5 Claims, No Drawings

PHOTOGRAPHIC ELEMENT COMPRISING ANTISTATIC LAYER

This is a continuation of application Ser. No. 08/556,471 filed Nov. 13, 1995, now U.S. Pat. No. 5,709,985.

FIELD OF THE INVENTION

The present invention relates to elements comprising antistatic layers containing colloidal vanadium oxide and a polymeric binder, and in particular to light-sensitive photographic elements comprising antistatic layers containing colloidal vanadium oxide and a polymeric binder.

BACKGROUND OF THE INVENTION

The use of polymeric film bases for carrying photographic layers is well known. In particular, photographic elements which require accurate physical characteristics use polyester film bases, such as polyethyleneterephthalate film bases, and cellulose ester film bases, such as cellulose triacetate film bases.

The formation of static electric charges on the film base is a serious problem in the production of photographic elements. While coating the light-sensitive emulsion, electric charges which accumulate on the base discharge, producing light which is recorded as an image on the light-sensitive layer. Other drawbacks which result from the accumulation of electric charges on polymeric film bases are the adherence of dust and dirt, coating defects and limitation of coating speed.

Additionally, photographic elements comprising light-sensitive layers coated onto polymeric film bases, when used in rolls or reels, which are mechanically wound and unwound, or in sheets, which are conveyed at high speed, tend to accumulate static charges and record the light generated by static discharges. Moreover, charge buildup can create difficulties in processing, such as jamming as the photographic films are fed through processing equipment.

The static-related damages occur not only before the photographic element has been manufactured, exposed and processed, but also after processing when the photographic element including the image is used to reproduce and enlarge the image. Accordingly, it is desired to provide permanent antistatic protection which retains its effectiveness even after processing.

To overcome the adverse effects resulting from accumulation of static electrical charges, photographic elements are provided with antistatic layers including electrically conductive materials which are capable of transporting charges away from areas where they are not desired. Typically, such antistatic layers contain electrically conductive substances, in particular polyelectrolytes such as the alkali metal salts of polycarboxylic acids or polysulfonic acids, or quaternary ammonium polymers, which dissipate the electrical charge by providing a surface which conducts electricity by an ionic mechanism. However, such layers are not very suitable as antistatic layers because they lose effectiveness under conditions of low relative humidity, become sticky under conditions of high relative humidity, and lose the antistatic effect after passage through photographic processing baths.

Antistatic materials that conduct electrons by a quantum mechanical mechanism rather than ions by an ionic mechanism are preferred because antistatic materials that conduct electrons by a quantum mechanical mechanism are effectively independent of humidity. They are suitable for use under conditions of low relative humidity, without losing effectiveness, and under conditions of high relative humidity, without becoming sticky. Defect semiconductor oxides and conductive polymers have been proposed as electronic conductors which operate independent of humidity. A major problem, however, with defect electronic conductors is that they generally cannot be provided as thin, transparent, relatively colorless coatings by solution coating methods.

Vanadium oxide antistatic coatings have been taught for use in photographic elements. U.S. Pat. No. 4,203,769 discloses a radiation-sensitive element comprising an antistatic layer of amorphous vanadium oxide. The antistatic layer can contain only vanadium oxide or the vanadium oxide may be dispersed in a binder. The amorphous vanadium oxide solution is prepared by heating the vanadium oxide to at least 100° C. above its melting point and casting the molten mass into a solubilizing amount of water. The vanadium oxide to binder weight ratio ranges up to about 1:7.

In photographic elements, the antistatic layer comprising vanadium oxide can be located on the side of the film base opposite to the image-forming layer as outermost layer, with or without a protective abrasion-resistant topcoat layer, or can be located as a subbing layer underlying a silver halide emulsion layer or an auxiliary gelatin layer. U.S. Pat. No. 5,221,598 indicates that vinylidene chloride/itaconic acid/methyl acrylate terpolymers and the like may be used as the polymeric binder for the antistatic layer. According to this patent, binder to vanadium oxide ratios can range from 1:5 to 200:1, but preferably are in the range from 1:1 to 10:1. U.S. Pat. No. 5,360,706 notes that when vinylidene chloride terpolymers are used with low amounts of vanadium oxide flocculation of the coating solution becomes a problem.

U.S. Pat. No. 5,006,451 and 5,221,598 describe a photographic material comprising a film base having thereon an antistatic layer comprising vanadium oxide and a barrier layer which overlies the antistatic layer. These patents report that the barrier layer is necessary to prevent the vanadium oxide from diffusing out of the underlying antistatic layer. See also U.S. Pat. No. 5,447,832, Example 26, which teaches that the antistatic properties of the vanadium oxide layer are destroyed after film processing if the vanadium oxide layer is not protected by an impermeable barrier. In addition, the use of a barrier layer is taught to be advantageous in that it provides excellent adhesion between the emulsion layer and the antistatic layer. Unfortunately, the solution provided by said patent requires a two-layer antistatic construction which requires additional investment and operating cost.

Accordingly, there is still the need to provide single layer antistatic layers, using vanadium oxide, which give permanent antistatic protection in photographic processing solutions.

SUMMARY OF THE INVENTION

The inventors discovered that if a vinyl addition polymer binder is used and the vanadium oxide to polymeric binder weight ratio is no greater than 1:30, the problems of diffusion of the vanadium oxide are minimized. However, production of a such single layer antistatic layer proved difficult due to interactions between the vanadium oxide and the binder polymers in the coating solution at such low vanadium oxide levels. Such interactions become especially problematic when the amounts of polymeric binders increase. Combination of the solution of the binder polymer with the colloidal vanadium oxide solution frequently results in unstable solutions which have coagulated lumps. However, the inventors found that if a fresh binder dispersion is used or if the dispersion is treated by storage at a temperature less than 10° C. for up to at least six months, dialysis, ultrafiltration, ion-exchange, or addition of acid scavengers, a stable dispersion of vanadium oxide and binder can be formed and used to coat a smooth, transparent antistatic layer.

The present invention, therefore, is a photographic element comprising a substrate, a photographic emulsion layer, and a single layer antistatic construction, wherein the antistatic layer comprises a vinyl addition polymer binder and colloidal vanadium oxide and the weight ratio of vanadium oxide to vinyl addition polymer is in the range from 1:30 to 1:500. The antistatic layer may be found either on the backside of the substrate from the photographic emulsion layer or may be located as an underlayer between the substrate and the emulsion layer. In either case, no barrier layer is provided to protect the antistatic layer from the photographic processing chemicals.

DETAILED DESCRIPTION OF THE INVENTION

In this application: "antistatic" refers to a material which exhibits static decay time for decay of a 5000V potential to less than 500V in less than 1 second or which contains a layer which has a sheet resistivity of less than $1.0 \times 10^{12}$ ohms/square; "permanent" means that the antistatic layer remains antistatic throughout the processing steps to create a final coated article and remains antistatic throughout film processing steps such as treatment with chemical developer and fixing solutions; "addition polymer" refers to a polymer formed by the chain addition of unsaturated monomer molecules, such as olefins, without the formation of a by-product; "stable" refers to homogeneous dispersions of colloidal vanadium oxide with vinyl addition polymers that can be stored with negligible precipitation or coagulation for at least two hours; "ions" refers to an atom or molecule which by loss or gain of one or more electrons has acquired a net electric charge; "barrier layer" refers to an overcoat applied over the antistatic layer which prevents migration of the vanadium oxide out of the antistatic layer.

The present invention relates to a light-sensitive photographic element comprising a polymeric film base, a silver halide emulsion layer, and an antistatic layer comprising colloidal vanadium oxide and a vinyl addition polymer binder in a dry weight ratio of from 1:30 to 1:500.

The polymeric film base comprises a polymeric substrate such as a polyester, especially polyethyleneterephthalate or polyethylenenaphthalate. Other useful polymeric film bases include cellulose acetates (especially cellulose triacetate) polyolefins, polycarbonates and the like. The polymeric film base has an antistatic layer adhered to one or both major surfaces of the base. A primer layer or a subbing layer may be used between the base and the antistatic layer. The antistatic layer may be present as a backing layer on the side of the base opposite the silver halide emulsion layer, as a subbing layer between the base and the emulsion layer in a single or double side coated photographic element, and/or as a subbing layer between the base and a different backing layer.

The antistatic layer of the present invention is obtained by mixing and coating a colloidal vanadium oxide and a polymer dispersion. Colloidal vanadium oxide useful in the preparation of the antistatic layer is an aqueous dispersion of single or mixed valence vanadium oxide, wherein the formal oxidation states of vanadium ions are typically +4 and +5. Such species are commonly referred to as $V_2O_5$.

Methods known for the preparation of vanadium oxide colloidal dispersions include inorganic methods such as ion exchange acidification of $NH_4VO_3$ (as described in DE 4,125,758A1), ion exchange of $NaVO_3$ (such as that described by Livage in Mat. Res. Bull., 1991, 26, 1173–1180), thermohydrolysis of $VOClO_3$ (such as that described by Wegelin in Z. Chem. Ind. Kolloide, 1912, 2, 25–28), reaction of vanadium oxide powder with hydrogen peroxide, and addition of molten $V_2O_5$ to water (such as that described in U.S. Pat. No. 4,203,769, Guestaux).

The preferred method for the preparation of vanadium oxide colloidal dispersions is described in U.S. Pat. No. 5,407,603 (Morrison), incorporated herein by reference. Preferably, the vanadium oxide dispersions are formed by hydrolysis and condensation reactions of vanadium oxide alkoxides, e.g., trialkoxides of the formula $VO(OR)_3$. The R group may be independently an aliphatic group, an aryl group, a heterocyclic group, or an arylalkyl group. A preferred vanadium oxide alkoxide is vanadium triisobutoxideoxide. Preferred colloidal vanadium oxide dispersions are prepared by hydrolyzing the vanadium oxoalkoxide with a molar excess of deionized water in the presence of hydrogen peroxide. The vanadium oxoalkoxide is added to a stirring solution of water and hydrogen peroxide. The hydrogen peroxide is present in an amount such that the molar ratio of vanadium oxoalkoxide to hydroperoxide is within a range of about 1:1 to 4:1. The dispersion is aged at room temperature for several days or at elevated temperatures (e.g., 80° C.) for a few hours to produce a dispersion with the most desirable properties for producing an antistatic coating. A sufficient amount of water is used in forming the colloidal dispersion so that the dispersion contains from about 0.005% by weight to about 3.5% by weight vanadium oxide.

Water miscible organic solvents may also be present in this dispersion. Miscible organic solvents include alcohols, low molecular weight ketones, dioxane, and solvents with a high dielectric constant, such as acetonitrile, dimethylformamide, dimethylsulfoxide, and the like.

In the dispersion suitable for use in this invention, the vanadium oxide is in the form of dispersed fibrillar particles preferably having a thickness in the range of 0.02–0.08 micrometers and a length up to 4 micrometers.

The other component used in the preparation of the antistatic layer according to the present invention is a vinyl addition polymer dispersion which is a water dispersion (latex) of a vinyl addition polymer. Useful monomers to prepare the water dispersible polymer according to the invention include: (a) acrylic and methacrylic acid, itaconic acid, esters of these, and the like; (b) styrene, alphamethylstyrene, and parachlorostyrene; (c) acrylamides and methacrylamides; (d) ethylenically unsaturated monomers such as vinyl chloride, vinylidene chloride, vinyl acetate, vinylidene fluoride, and vinyl azlactones, (e) allyl derivatives such as diallyl phthalate, triallyl cyanurate, and the like, and (f) ethylenically unsaturated sulfonated monomers such as 2-acrylamido-2-methyl propane sulfonic acid. The polymer of the invention can be a homopolymer, copolymer, terpolymer, or tetrapolymer which, when mixed with colloidal vanadium oxide, will produce a stable dispersion.

A preferred polymer is a terpolymer, prepared by mixing compatible monomers in the presence of a free radical catalyst and heat to obtain the desired reaction rate. As is known to those skilled in the art, when monomers of the invention form terpolymers, units selected from the above monomers may react in any proportion and may be distributed throughout the polymer randomly depending on the monomers and the reactivity ratios of the monomers.

A particularly suitable water dispersible polymer for the practice of the present invention is a terpolymer of the type described in U.S. Pat. No. 2,627,088 (Alles), comprising from 35 to 96% by weight of vinylidene chloride, from about 3.5 to 64.5% by weight of an ethylenically unsaturated ester, and from about 0.5 to 25% by weight of itaconic acid, the half-methyl ester of itaconic acid, acrylic acid, or methacrylic acid. Because of the previously noted problem of coagulation of the colloidal vanadium oxide, care must be taken to insure the stability of antistatic coating formulations comprising vanadium oxide. In particular, aqueous dispersions of vinyl addition polymers typically undergo undesirable interactions with colloidal vanadium oxide. U.S. Pat. No. 5,360,706 demonstrates that interaction between vinyl addition polymer latexes and colloidal vanadium oxide results in coating solution instability (for example, in Examples 1–8 and Comparative Example C1–C4). In seeking to improve the stability of aqueous coating solutions comprised of dispersions of vinyl addition polymers and colloidal vanadium oxide, the inventors have found that certain initiators can be advantageously used and that it is advantageous to minimize decomposition of, or to remove or neutralize the deleterious polymer dispersion components.

Polymerization of the monomers may be carried out by employing initiators which generate free radicals on application of activating energy as is conventionally used in the polymerization of ethylenically unsaturated monomers. Included among useful free radical initiators are thermally activated initiators such as organic peroxides, organic hydroperoxides, azo compounds, and so-called redox initiators. Examples of useful redox initiators include systems combining: (1) potassium persulfate and sodium (meta) bisulfite; (2) potassium persulfate, sodium (meta)bisulfite, and ferrous sulfate; (3) sodium persulfate and sodium (meta) bisulfite, (4) hydrogen peroxide and ascorbic acid, (5) organic hydroperoxides and ascorbic acid. Typically, from about 0.1 to about 10% by weight based on weight of the monomers of thermal initiator is used.

The aqueous polymer dispersions suitable can be prepared by emulsion polymerization reactions employing conventional surfactants. Such reaction conditions are well known and are described in the polymerization art (e.g., Billmeyer in Chapter 6, p. 128–132 of "Textbook of Polymer Science", John Wiley & Sons, 1984). Alternatively, aqueous polymer dispersion can be prepared by polymerization of monomers in a solvent other than water and an aqueous dispersion can be prepared therefrom by admixing the polymer solution with water.

Vinyl addition polymers may be prepared by using initiator systems which contain no ions to cause coagulation. Preferred initiator systems include redox initiator systems based on sodium persulfate, hydrogen peroxide, or organic hydroperoxides and water soluble azo initiator systems. The azo initiator systems are non-ionic or anionic derivatives of azoisobutyronitrile and are commercially available from Wako Chemical Company, Richmond, Va. When the activating energy of the initiator is heat, polymerization preferably is carried out at a temperature from 20° to 60° C. for about 5–48 hours.

The inventors have found that vinyl addition polymers used in the invention undergo dehydrohalogenation. Dehydrohalogenation is the elimination of the halogen from the polymer and yields a halogen ion or an acidic species, such as HF, HBr, or HCl. These degradation products can cause flocculation, dissolution, or coagulation of the colloidal vanadium oxide when the coating solutions needed for making this invention are prepared. The extent of dehydrohalogenation can be monitored by measuring pH or the conductivity of the solution. In the absence of other ions or in the case that the concentration of other ions is constant, the change in concentration of hydrogen halide acid dehydrohalogenation products can be easily evaluated by conductance measurements. However, measurement of pH gives a more specific determination of hydrogen halide acid concentration. In order to avoid flocculation, dissolution, or coagulation of the colloidal vanadium oxide when the coating solutions are prepared the pH should be maintained above 2.3, preferably above 2.4, and most preferably above 2.7.

In addition, special precautions preferably are taken before combining the vanadium oxide and polymer dispersions, especially if certain less desirable initiator systems are used. First, the polymerization reaction temperature should be controlled as indicated above to minimize dehydrohalogenation. After production of the polymer dispersions, the polymer dispersions are preferably stored at low temperatures, preferably less than 10° C., more preferably 4–10° C., and most preferably about 5° C. When the polymer dispersion is stored at these low temperatures, stable vanadium oxide/polymer dispersions can be prepared with polymer dispersions that are up to about 6 months old and perhaps older.

Acid scavengers, such as inorganic salts, organic acid scavengers, or polymerizable monomers with acid scavenging moieties, may be added to the polymer dispersion. The amount of ionic salt acid scavenger may be up to 10% by weight based on the weight of solids in the coating dispersion (vanadium oxide and polymer in water), preferably 0.001–2%, and more preferably 0.05–1%. Preferred inorganic salts include lithium acetate, lithium phosphate, lithium salicylate, lithium carbonate, lithium benzoate, and lithium hydroxide. Care must be used in the selection of the inorganic salt because some alkaline metals, such as potassium, may contribute to the flocculation or coagulation of the vanadium oxide. Useful organic acid scavengers include epoxy group containing compounds. Useful polymerizable monomers that contain acid scavenger moieties and may be incorporated within the polymer backbone or may be made into a separate emulsion polymer particle. The amount of such monomers may be up to 50% based upon total weight of the polymer but are preferably from 5 to 20% by weight. Polymerizable moieties with epoxy groups, such as glycidal methacrylate, are preferred.

As yet another approach, an ion-exchange resin may be used to remove ions associated with the dehydrohalogenation reaction or undesirable ions associated with certain initiator systems. An anion exchange resin may be used to absorb hydrogen halide acids or to exchange a more basic anion for the weakly basic halide ion. An example of a more basic anion which may be advantageously exchanged for the halide ion is the acetate ion. Other carboxylate anions can also be useful. The ion exchange resin may be in a free-base, hydroxyl, or carboxylate form. Examples include Amberlyst A-21 ion-exchange resin, Amberlyst A-26 ion-exchange resin, Amberlite IR-68 ion-exchange resin, Amberlite IRA-400 ion-exchange resin, Amberlite IR-401 ion-exchange resin, Amberlite IRA-410 ion-exchange resin (all from Rohm & Haas). A cation exchange resin may be used to exchange monovalent cations for hydrogen ions. A preferred monovalent cation is the Li⁺ ion. Examples of useful cation exchange resins include Amberlite IR 120 Plus ion exchange resin and Amberlite IRC 84 ion exchange resin (both from Rohm and Haas). Ion exchange treatment of the vinyl addition polymer may be done in a batch process or by passing the vinyl addition polymer latex through a column containing the ion exchange resin. Preferably the vinyl addition polymer of the invention is mixed with the ion-exchange resin at room temperature for 5 minutes to 2 hours. The ion-exchange resin may be removed by decantation or filtration.

According to another method, the polymer dispersions are subjected to a dialysis treatment to remove soluble salts and polymeric fractions having low molecular weight (e.g., less than 10,000). Conventional dialysis method and apparatus can be used, such as, for example, SpectraPor-4 dialysis tubing manufactured by Baxter Diagnostics, Inc., McGraw Park, Ill. and, preferably, having no more than 15,000 molecular weight cut-off, such as, for example, a 12,000–14,000 molecular weight cut-off. However, dialysis tubing with molecular weight cut-offs up to even 100,000 may be useful.

According to a final method, ultrafiltration can be used. In ultrafiltration, a feed solution is pumped under pressure over the surface of a supported membrane. The pressure gradient across the membrane forces solvent and smaller species through the pores of the membranes while larger molecules are retained. The concentration of larger molecules in the retained phase increases. By successively repeating the steps of concentration and dilution with pure solvent, the retained portion is purified of smaller species. Suitable membranes are similar to those used for dialysis. The molecular weight cut-off for the membranes is preferably in the range from 10,000 to 100,000.

Organic solvents miscible with water can be added to the coating composition for preparing the antistatic layer according to this invention. Examples of such organic solvents that can be used include acetone, methyl ethyl ketone, methanol, ethanol, and other alcohols and ketones. The presence of such solvents is desirable when need exists to alter the coating characteristics of the coating solution.

For preparation of the mixture of colloidal vanadium oxide and polymer dispersion, a most preferred colloidal dispersion of vanadium oxide can be prepared, as noted above, by the hydrolysis of a vanadium oxoalkoxide with a molar excess of deionized water. A preferred preparation is the addition of vanadium triisobutoxideoxide to a hydrogen peroxide solution, as described in detail below. The vanadium oxide dispersion can be diluted with deionized water to a desired concentration before mixing with the aqueous polymer dispersion.

Dispersions containing very small amounts of vanadium oxide can provide useful coatings for the present invention. In all cases, the amount of vanadium oxide present should be sufficient to confer antistatic properties to the final coating. The use of deionized water also helps avoid problems with flocculation of the colloidal particles in the dispersions. Deionized water has had a significant amount of $Ca^{2+}$ and $Mg^{2+}$ ions removed. Preferably, the deionized water contains less than about 50 ppm of these multivalent cations, most preferably less than 5 ppm.

The polymer dispersion and the vanadium oxide dispersion are mixed together. Generally, this involves stirring the two dispersions together for sufficient time to effect complete mixing. Preferably the concentration of the polymer in the coating dispersion of polymer and vanadium oxide is greater than about 0.5% by weight, more preferably greater than about 1.0% by weight. These coating dispersions preferably exhibit stability for a period of at least 2 hours, preferably for at least 16 hours, and more preferably for at least 48 hours.

Surfactants can be added during the mixing step. Any water compatible surfactant, except those of high acidity or basicity or complexing ability, or those which otherwise would interfere with the functioning of the photographic element, is suitable for the practice of this invention. A suitable surfactant does not alter the antistatic characteristics of the coating, but allows for the uniform wetting of a substrate surface by the coating solution. Depending upon the substrate, wetting out completely can be difficult, so it is sometimes convenient to alter the coating composition by the addition of organic solvents. It is apparent to those skilled in the art that the addition of various solvents is acceptable, as long as it does not cause flocculation or precipitation of the vanadium oxide.

Alternatively, the vanadium oxide dispersion can be generated in the presence of a polymer dispersion by, for example, the addition of $VO(i-BuO)_3$ (vanadium triisobutoxide oxide) to a dispersion of polymer, optionally containing hydrogen peroxide, and aging this mixture at 50° C. for several hours to several days. In this way, colloidal vanadium oxide dispersions can be prepared in situ with dispersions with which they might otherwise be incompatible, as evidenced by flocculation of the colloidal dispersion. This method may be a more convenient preparation method for some dispersions.

The colloidal vanadium oxide/polymer dispersion compositions can contain any percent by weight solids. For ease of coatability, these compositions preferably comprise more than about 0.05% by weight solids, preferably more than 0.50% by weight solids, and up to about 15% by weight solids, preferably up to 10% by weight solids, and most preferably up to 6% by weight solids. In the dried solids, the weight ratio of vanadium oxide to polymer may vary from 1:30 to 1:500, preferably from 1:30 to 1:400, and more preferably from 1:30 to 1:350. Higher values, for example, 1:10 or 1:20, of vanadium oxide/polymer weight ratios tend to give poor antistatic performance after processing.

The coatings prepared from the colloidal vanadium oxide/polymer dispersion compositions of the antistatic layer according to the present invention typically contain whisker shaped colloidal particles of vanadium oxide. These particles can have a high aspect ratio, (i.e., greater than 10 and even as high as 200) and are generally evenly distributed. The colloidal particles were examined by field emission scanning electron microscopy. The micrographs of some samples of vanadium oxide dispersions showed evenly dispersed, whisker-shaped colloidal particles of vanadium oxide, approximately 0.02 to 0.08 µm wide and 1.0 to 4.0 µm long. This invention is not limited to those dimensions of vanadium oxide particles. However, aspect ratios greater than 10, more preferably greater than 20, and most preferably greater than 50, are preferred.

These dispersions can be coated by dip coating, spin coatings, roll coating, knife coating, extrusion coating, and the like. Coatings can also be formed by spray coating, although this is less preferred.

Once the dispersion is coated out, the coated film can be dried, generally at a temperature from room temperature up to a temperature limited by film base and polymer dispersion, preferably room temperature to 200° C., most preferably 50 to 150° C., for a few minutes. The dried coating weight preferably can be in the range of 10 mg/m² to 1 g/m².

The antistatic layer of the present invention may contain other addenda which do not influence the antistatic properties of the layer, such as, for example, matting agents, surfactants, adhesion promoters, plasticizers, coating aids, lubricants, coalescing agents, dyes, and haze reducing agents.

The matting agents to be used in the antistatic layer of the present invention can be either inorganic or organic compounds. Examples of useful matting agents include titanium dioxide, silica, aluminum oxide, starch, cellulose esters such as cellulose propionate acetate, cellulose ethers such as ethyl-cellulose, synthetic resins such as acrylic and methacrylic acid esters, polyvinyl resins such as polyvinylacetate, polycarbonates, styrene homopolymers and copolymers, and the like. The most preferred matting agent is polymethylmethacrylate. Matting agents are incorporated into the layer under the form of small particles uniformly dispersed therein having an average diameter preferably in the range from 3 to 6 μm. They may be either directly dispersed in the layer or may be dispersed in water solutions or in the water dispersions of the layer binding material and then added to the coating composition prior to coating itself. Examples of matting agents and methods for the preparation and introduction of the matting agents into the layer are described for example in U.S. Pat. Nos. 2,322,037, 3,701,245, 3,411,907 and 3,754,924.

Preferred adhesion promoters in the antistatic layer of the present invention are epoxy-silane compounds represented by the following general formulae:

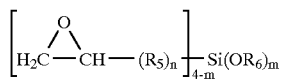

and

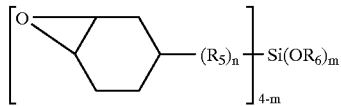

wherein:

$R_5$ is a divalent hydrocarbon radical of less than 20 carbon atoms (the backbone of which is composed only of carbon atoms or of nitrogen, sulfur, silicon and oxygen atoms in addition to carbon atoms with no adjacent heteroatoms within the backbone of said divalent radical except silicon and oxygen), $R_6$ is hydrogen, an aliphatic hydrocarbon radical of less than 10 carbon atoms or an acyl radical of less than 10 carbon atoms, n is 0 or 1, and m is 1 to 3, the most preferred epoxy-silane compounds being those of formulae

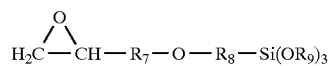

or

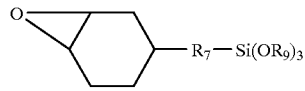

wherein:

$R_7$ and $R_8$ are independently alkylene groups of 1 to 4 carbon atoms, and $R_9$ is hydrogen or an alkyl group of 1 to 10, most preferably 1 to 4 carbon atoms.

Examples of divalent radicals represented by $R_5$ in the above formulae include methylene, ethylene, decalene, phenylene, cyclohexylene, cyclopentene, methylcyclohexylene, 2-ethylbutylene and allene, an ether radical such as: $-CH_2-CH_2-O-CH_2-CH_2-$, $-(CH_2-CH_2-O)_2-CH_2-CH_2-$, $-C_6H_4-O-CH_2-CH_2-$ and $-CH_2-O-(CH_2)_3-$, or a siloxane radical such as: $-CH_2(CH_3)_2Si-O-$, $-(CH_2)_2(CH_2)_2Si-O-$, $-(CH_2)_3(CH_3)_2Si-O-$.

Examples of aliphatic hydrocarbon radicals represented by $R_6$ include methyl, ethyl, isopropyl, butyl, and examples of acyl radicals represented by $R_6$ include formyl, acetyl, propionyl.

The epoxy-silane compounds useful in the present invention are preferably γ-glycydoxypropyl-trimethoxy-silane and β-(3,4-epoxycyclo-hexyl)-ethyl-trimethoxy-silane, the most preferred being γ-glycydoxypropyl-trimethoxy-silane.

The epoxy-silane compounds described above can be prepared according to methods known in the art, such as for example the methods described in W. Noll, *Chemistry and Technology of Silicones*, Academic Press (1968), pp. 171-3, and in *Journal of American Chemical Society*, Vol. 81 (1959) p. 2632.

Epoxy-silane compounds may be added to the coating solution containing vanadium oxide and polymer dispersion as neat liquids or solids or as solutions in suitable solvents. The epoxy-silane compounds may be hydrolyzed completely or partially before addition. By "partially hydrolyzed" it is meant that not all of the hydrolyzable silicon-alkoxide or silicon-carboxylate groups have been removed from the silane by reaction with water. Hydrolysis of epoxy-silane compounds is conveniently done in the presence of water and a catalyst such as an acid, a base, or fluoride ion. The hydrolyzed epoxy-silane compounds may exist as siloxane polymers or oligomers resulting from condensation of silanol groups produced in the hydrolytic reaction of the epoxy-silane compound with other silanol groups or with unreacted silicon-alkoxide or silicon-carboxylate bonds. It may be desirable to add epoxy-silane compounds in the form of co-hydrolysates or co-hydrolysates and co-condensates with other, non-epoxy silane compounds.

The proportions of epoxy-silane compound in the antistatic layer according to this invention can be widely varied to meet the requirements of the particular photographic element or polymeric film base which is to be provided with an antistatic layer. Typically, the weight ratio of epoxy-silane to polymer dispersion will be in the range of about 0.1 to about 0.6, and preferably of about 0.2 to about 0.4.

Other useful adhesion promoters include non-silane epoxy compounds such as polyethylene glycol diglycidyl ethers, bis-phenol A diepoxide, epoxy containing polymers, epoxy containing polymer latices, and epoxy functional monomers.

Representative plasticizers which can be added to the antistatic layer of the present invention include alcohols, amides, cellulose derivatives, esters, phosphate esters, phthalate esters, tetraethyleneglycol dimethylether, lactams, polyacrylic acid esters, polyvinylacetates, polyurethanes and the like. Useful lubricants include fatty acids, esters, polyesters, primary amides, polysaccharide derivatives, polytetrafluoroethylene, colloidal silica, silicone derivatives, phosphate triesters, polymethylmethacrylate, paraffins, waxes, such as carnauba wax and the like. Other examples of plasticizers and lubricants can be found in Research Disclosure 308,119, December, 1989, Item XII.

The photographic elements useful in this invention may be any of the well-known silver halide photographic elements for imaging in the field of graphic arts, printing, color, medical and information systems.

Typical imaging element constructions of the present invention comprise:

1. The film base with an antistatic layer on one surface and the photographic silver halide emulsion layer or layers on the other surface of the film base. In this construction an auxiliary layer may or may not be present over the antistatic layer. Examples of auxiliary layers include backing, antiscratching, anticurling, or slipping layers, backing gelatin antihalation layers, and magnetic recording layers containing a magnetic material. These auxiliary layers are not barrier layers. A very thin gelatin layer about 30 nm to 100 nm in thickness may be interposed between the antistatic layer and auxiliary layers comprising gelatin.

2. The film base with an antistatic layer on one surface and at least one silver halide emulsion layer adhered to the same surface as the antistatic layer, over the antistatic layer. A very thin gelatin layer about 30 nm to 100 nm in thickness may be interposed between the antistatic layer and the silver halide emulsion layer.

3. The film base with antistatic layers on both surfaces of the polymeric film base and at least one photographic silver halide emulsion layer on one or both sides of the film base, over said antistatic layers.

The silver halides employed in this invention may be any one for use in silver halide photographic emulsions, such as silver chloride, silver bromide, silver iodide, silver chlorobromide, silver chloroiodide, silver iodobromide and silver chloroiodobromide.

The grains of these silver halides may be coarse or fine, and the grain size distribution of them may be narrow or extensive. Further, the silver halide grains may be regular grains having a regular crystal structure such as cube, octahedron, and tetradecahedron, or the spherical or irregular crystal structure, or those having crystal defects such as twin planes, or those having a tabular form, or combination thereof. Furthermore, the grain structure of the silver halides may be uniform from the interior to exterior thereof, or be multilayer. According to a simple embodiment, the grains may comprise a core and a shell, which may have different halide compositions and/or may have undergone different modifications such as the addition of dopants. Besides having a differently composed core and shell, the silver halide grains may also comprise different phases in between. Furthermore, the silver halides may be of such a type as allows a latent image to be formed mainly on the surface thereof or such a type as allows it to be formed inside the grains thereof.

The silver halide emulsions which can be utilized in this invention may be prepared according to different methods as described in, for example, *The Theory of the Photographic Process*, C. E. K. Mees and T. H. James, Macmillan (1966), *Chimie et Physique Photographigue*, P. Glafkides, Paul Montel (1967), *Photographic Emulsion Chemistry*, G. F. Duffin, The Focal Press (1966), *Making and Coating Photographic Emulsion*, V. L. Zelikman, The Focal Press (1966), in U.S. Pat. No. 2,592,250 or in GB Pat. No. 635,841.

The emulsions can be desalted to remove soluble salts in the usual ways, e.g., by dialysis, by flocculation and re-dispersing, or by ultrafiltration. Emulsions still having soluble salts are also acceptable.

As the binder of protective colloid for use in the photographic element, gelatin is advantageously used, but other hydrophilic colloids may be used such as gelatin derivatives, colloidal albumin, gum arabic, colloidal hydrated silica, cellulose ester derivatives such as alkyl esters of carboxylated cellulose, hydroxy ethyl cellulose, carlboxy methyl cellulose, synthetic resins, such as the amphoteric copolymers described in U.S. Pat. No. 2,949,442, polyvinyl alcohol, and others well known in the art. These binders may be used in admixture with dispersed (latex-type) vinyl polymers, such as those disclosed, for example, in U.S. Pat. Nos. 3,142,568; 3,193,386; 3,062,674; 3,220,844.

The silver halide emulsions can be sensitized with a chemical sensitizer as known in the art such as, for example, a noble metal sensitizer, a sulfur sensitizer, a selenium sensitizer and a reduction sensitizer.

The silver halide emulsions can be spectrally sensitized (ortho-, pan- or infrared-sensitized) with spectral sensitizing dyes, including methine dyes such as those described in *The Cyanine Dyes and Related Compounds*, F. H. Hamer, John Wiley & Sons (1964). Dyes that can be used for the purpose of spectral sensitization include cyanine dyes, merocyanine dyes, complex cyanine dyes, complex merocyanine dyes, homopolar cyanine dyes, hemicyanine dyes, styryl dyes and hemioxonol dyes. Particularly useful dyes are those belonging to the class of cyanine dyes, merocyanine dyes and complex merocyanine dyes. Other dyes, which per se do not have any spectral sensitization activity, or certain other compounds, which do not substantially absorb visible radiation, can have a supersensitization effect when they are used in combination with said spectral sensitizing dyes. Among suitable sensitizers known in the art, heterocyclic mercapto compounds containing at least one electronegative substituent, nitrogen-containing heterocyclic ring-substituted aminostilbene compounds, aromatic organic acid/formaldehyde condensation products, cadmium salts and azaindene compounds are particularly useful.

The silver halide photographic elements according to the present invention may comprise compounds preventing the formation of fog or stabilizing the photographic characteristics during the production or storage of photographic elements or during the photographic treatment thereof, such as heterocyclic nitrogen-containing compounds, arylthiosulfinic acids and arylthiosulfonic acids.

The photographic elements according to this invention may comprise other additives such as desensitizers, brightening agents, couplers, hardening agents, coating agents, plasticizers, lubricants, matting agents, high-boiling organic solvents, development accelerating compounds, UV absorbers, antistain agents, and the like as described, for example, in Research Disclosure Vol. 176, No. 17643, December 1979.

The photographic elements according to this invention can be used for any general black and white photography, graphic arts, X-ray, print, microfilm, electron-ray record, infrared-ray record, color photography and the like.

Particularly useful photographic elements according to this invention are silver chloride emulsion elements as conventionally employed in forming halftone, dot, and line images usually called "lith" elements. Said elements contain silver halide emulsions comprising preferably at least 50 mole % of silver chloride, more preferably at least 80 mole % of silver chloride, the balance, if any, being silver bromide. If desired, said silver halides can contain a small amount of silver iodide, in an amount that is usually less than about 5 mole %, preferably less than 1 mole %. The average grain size of silver halide used in lith emulsions is lower than about 0.7 $\mu$m, preferably lower than about 0.4 $\mu$m, more preferably lower than 0.2 $\mu$m. The lith elements can include a hydrazine compound to obtain high contrast images. Any known hydrazine compounds can be used, such as, for example, hydrazine compounds described in Research Disclosure 235, Item 23510, November, 1983, *Development Nucleation by Hydrazine and Hydrazine Derivatives.* Other references to lith materials can be found in the same Research Disclosure.

Color photographic elements for use in the present invention comprise silver halide emulsion layers selectively sensitive to different portions of the visible and/or infrared spectrum and associated with yellow, magenta and cyan dye forming couplers which form (upon reaction with an oxidized primary amine type color developing agent) respectively yellow, magenta and cyan dye images. As examples of yellow couplers, open chain ketomethylene compounds can be used, such as benzoylacetoanilide type yellow couplers. Two-equivalent type yellow couplers, in which a substituent capable of separating off at the time of coupling reaction attached to the carbon atom of the coupling position, can be used advantageously. As examples of magenta couplers, pyrazolone type, pyrazolotriazole type, pyrazolinobenzimidazole type and indazolone type magenta couplers can be used. As examples of cyan couplers, phenol and naphthol type cyan couplers can be used. Colored magenta couplers and colored cyan couplers can also be used advantageously, in addition to the above-mentioned couplers. For the purpose of improving sharpness and graininess of the image, the light-sensitive color materials used in this invention may additionally contain development inhibitor-releasing couplers or compounds.

Silver halide photographic elements for X-ray exposure to be used in the present invention comprise a transparent film base, such as a polyethyleneterephthalate film base, having on at least one of its sides, preferably on both of its sides, a silver halide emulsion layer. The silver halide emulsions coated on the sides may be the same or different and comprise silver halide emulsions commonly used in photographic elements, among which the silver bromide or silver bromoiodide emulsions being particularly useful for X-ray elements. The silver halide grains may have different shapes, for instance cubic, octahedral, spherical, tabular shapes, and may have epitaxial growth; they generally have mean grain sizes ranging from 0.2 to 3 $\mu$m, more preferably from 0.4 to 1.5 $\mu$m. Particularly useful in X-ray elements are high aspect ratio or intermediate aspect ratio tabular silver halide grains, as disclosed for example in U.S. Pat. Nos. 4,425,425 and 4,425,426, having an aspect ratio, that is the ratio of diameter to thickness, of greater that 5:1, preferably greater than 8:1. The silver halide emulsions are coated on the film base at a total silver coverage comprising in the range from about 2.5 to about 6 g/m$^2$.

Usually, the light-sensitive silver halide elements for X-ray recording are associated during X-ray exposure with intensifying screens as to be exposed to radiation emitted by said screens. The screens are made of relatively thick phosphor layers which transform X-rays into light radiation (e.g., visible light or infrared radiation). The screens absorb a portion of X-rays much larger than the light-sensitive element and are used to reduce radiation dose necessary to obtain a useful image. According to their chemical composition, the phosphors can emit radiation in the blue, green, red or infrared region of the electromagnetic spectrum and the silver halide emulsions are sensitized to the wavelength region of the radiation emitted by the screens. Sensitization is performed by using spectral sensitizing dyes as known in the art. Particularly useful phosphors are the rare earth oxysulfides doped to control the wavelength of the emitted light and their own efficiency. Preferably are lanthanum, gadolinium and lutetium oxysulfides doped with trivalent terbium as described in U.S. Pat. No. 3,752,704. Among these phosphors, the preferred ones are gadolinum oxysulfides wherein from about 0.005% to about 8% by weight of the gadolinium ions are substituted with trivalent terbium ions, which upon excitation by UV radiation, X-rays, cathodic rays emit in the blue-green region of the spectrum with a main emission line at about 544 nm. The silver halide emulsions are spectrally sensitized to the spectral region of the light emitted by the screens, preferably to a spectral region of an interval comprised within 25 nm from the wavelength maximum emission of the screen, more preferably within 15 nm, and most preferably within 10 nm.

Another well known class of photosensitive imaging elements comprising silver halides and involving dry processing, which can represent the photographic material of the present invention, include the so called dry silver films (photothermographic elements). Dry silver films are exposed by means of actinic radiation to form a latent image, which is then amplified by means of heat. In photothermographic elements the photothermographic silver halide is in catalytic proximity to a non-photosensitive, reducible silver source (e.g., silver behenate) so that when silver nuclei are generated by light exposure of the silver halide, those nuclei are able to catalyze the reduction of the reducible silver source. The latent image is rendered visible by application of uniform heat across the element. These and other photothernographic materials have been described by J. W. Carpenter and P. W. Lauf in their review of "Photothermographic Silver Halide Systems", Research Disclosure, No. 17029, June, 1978. Within this class can be further cited the prephotothermographic elements described in U.S. Pat. Nos. 3,764,329, 3,802,888, 3,816,132 and 4,113,496. They comprise, instead of silver halides, some particular halide anion thermal precursors, which allow the formation of silver halide when the elements are uniformly heated before imagewise photoexposure. These elements can be daylight handled before thermal activation.

The light-sensitive silver halide photographic elements according to this invention can be processed after exposure to form a visible image according to processes which are generally employed for the light-sensitive elements for general black and white photography, X-ray, microfilm, lith film, print or color photography. In particular, the basic treatments steps of black and white photography include development with a black and white developing solution and fixation, and the basic treatment steps of color photography include color development, bleach and fixation. Processing formulations and techniques are described, for example, in *Photographic Processing Chemistry,* L. F. Mason, Focal Press (1966), *Processing Chemicals and Formulas,* Publication J-1, Eastman Kodak Company (1973), *Photo-Lab Index,* Morgan and Morgan, Dobbs Ferry (1977), *Neblette's Handbook of Photography and Reprography—Materials, Process and Systems,* VanNostrand Reinhold, 7th Ed. (1977), and Research Disclosure, Item 17643 December, 1978).

Objects and advantages of this invention are further illustrated by the following examples, but the particular materials and amounts thereof recited in these examples, as well as other conditions and details, should not be construed to unduly limit this invention.

In the Examples below, all percents are by weight unless otherwise indicated.

I. PREPARATION OF VANADIUM OXIDE

Vanadium oxide colloidal dispersion was prepared by adding vanadium triisobutoxide ($VO(O-iBu)_3$) (15.8 g, 0.055 moles, Akzo Chemicals, Inc., Chicago, Ill.) to a rapidly stirring solution of hydrogen peroxide (1.56 g of a 30% aqueous solution, 0.0138 moles, Maiinckrodt, Paris, Ky.) in deionized water (232.8 g) at room temperature giving a solution with vanadium concentration equal to 0.22 moles/kg (2.0% $V_2O_5$). Upon addition of the vanadium isobutoxide, the mixture became dark brown and gelled within five minutes. With continuous stirring, the dark brown gel broke up giving an inhomogeneous, viscous dark brown solution which was homogeneous in about 45 minutes. The sample was stirred for 1.5 hours at room temperature. It was then transferred to a polyethylene bottle and aged in a constant temperature bath at 50° C. for 6 days to give a dark brown thixotropic colloidal dispersion.

The concentration of $V^{+4}$ in the gel was determined by titration with potassium permanganate to be 0.072 moles/kg. This corresponded to a mole fraction of $V^{+4}$ [i.e., $V^{+4}$/total vanadium] of 0.33.

The colloidal dispersion was then further mixed with deionized water to form desired concentrations before use in coating formulations.

II. PREPARATION OF POLYMER DISPERSION (LATEX)

Synthesis of Poly(vinylidene chloride-methylacrylate-itaconic acid) latex. A mixture of 229.4 g (2.37 mol) vinylidene chloride plus 21.1 g (0.245 mol) methyl acrylate was degassed by two freeze-pump-thaw cycles and added via cannula to a solution of 6.9 g (0.053 mol) itaconic acid in 1213 g deionized water situated in a 2 liter 3 necked round bottom flask. Then 40.4 ml 10% by weight sodium lauryl sulfate, 20.2 ml of 5% by weight $K_2S_2O_8$, 20.2 ml of 5% by weight $Na_2S_2O_5$, and 4.0 ml of 1.0% by weight $FeSO_4.7H_2O$ were added sequentially at approximately one minute intervals. The reaction was allowed to warm to 24° C. by the exothermic reaction over a period of about 15 minutes and then the reaction vessel was cooled by immersion in cold tap water (temperature about 5° C.). In this manner, the maximum temperature obtained by the reaction mixture was 30° C. After stirring for four hours, unreacted monomers were removed by vacuum distillation (2 mm Hg) at room temperature to give a polymer latex with a mole ratio of vinylidene chloride/methyl acrylate/itaconic acid= 89/9/2 and 16.5 weight percent solids.

III. DIALYSIS OF TERPOLYMER DISPERSION (LATEX)

Poly(vinylidene chloride-methylacrylate-itaconic acid) latex (1389 g, prepared as described in Preparation II) was placed in SpectraPor-4 dialysis tubing (12,000–14,000 molecular weight cut-off, product of Baxter Diagnostics, Inc., McGraw Park, Ill.) and dialysed against deionized water for four days to give 1796 g of dialysed latex containing 12.8% polymer.

IV. PREPARATION OF TERPOLYMER DISPERSION (LATEX)

Synthesis of Poly(vinylidene chloride-methylacrylate-itaconic acid) latex. A one liter flask was charged with 0.69 g of sodium lauryl sulfate, 0.88 g of itaconic acid, 191 g of deionized water, and 6.6 g of methyl acrylate. The flask was purged with nitrogen for 15 minutes. Vinylidene chloride (37.3 g) was added to the flask and the nitrogen purge discontinued. Then 6.25 g of 5% by weight $K_2S_2O_8$, 6.25 g of 5% by weight $Na_2S_2O_5$, and 2.5 g of 1.0% by weight $FeSO_4*7H_2O$ were added sequentially at approximately one minute intervals. The reaction was allowed to warm to 24° C. by the exothermic reaction over a period of about 15 minutes and then the reaction vessel was immersed in tap water (temperature about 20° C.). Ice was added to the water bath so that the maximum temperature inside the flask was 29° C. or less. After stirring for four hours, unreacted monomers were removed by vacuum distillation at room temperature to give a polymer latex with a molar ratio of vinylidene chloride/methyl acrylate/itaconic acid equal to 83/15/2 and 18.0% by weight solids.

V. PREPARATION OF COATING MIXTURES

General Procedure:

The vanadium oxide colloidal dispersion was diluted to desired concentration by mixing with deionized water. This solution was mixed with an aqueous dispersion of the polymer and a small amount of a surfactant. Addition of surfactant was preferred to improve the wetting properties of the coating. The mixture was coated with a Mayer bar (available from RD Specialties of Webster, N.Y.) onto a film substrate such as polyethyleneterephthalate or polyethyleneterephthalate which had been primed with polyvinylidene chloride in order to perform static decay and surface resistivity measurements. It was found possible to coat the antistatic composition onto film substrates as such without employing film treatments (e.g., flame treatment, corona treatment, plasma treatment) or onto additional layers (e.g., primers, subbings). However, such treatments may be useful.

The coated article was dried at 100° C. for approximately 5 minutes. The antistatic properties of the coated film were measured by determining the surface resistivity of each coated sample. Surface resistivity measurements were made using the following procedure: samples of each film were kept in a cell. at 21° C. and 25% R.H. (relative humidity) for 24 hours and the electrical resistivity was measured by means of a Hewlett-Packard High resistance Meter model 4329A (Examples 1–3 and Comparative Examples A–B). Alternatively surface resistivity was measured using an Electrotech Model 803B Resistance/Resistivity probe and Electrotech Model 872 Wide Range Resistance Meter available from Electro-Tech Systems, Inc. Glenside, Pa. (Examples 7–10 and Comparative Example D)Values of resistivity of less than $5-10^{11}$ ohms/cm$^2$ are optimum. Values up to $1\times10^{12}$ ohms/cm$^2$ can be useful. The following examples also report four adhesion values: the first is the dry adhesion value and refers to the adhesion of an auxiliary gelatin layers to the antistatic layer prior to the photographic processing; the second and the third adhesion values are the wet adhesion values and refer to the adhesion of the above layer to the antistatic layer during the photographic processing (developer and fixer); the fourth adhesion value is the dry adhesion value and refers to the adhesion of the above layer to the antistatic layer after photographic processing. In particular, the dry adhesion was measured by tearing samples of the coated film, applying a 3M Scotch™ brand 5959 Pressure Sensitive Tape along the tear line of the film and separating rapidly the tape from the film: the layer adhesion was evaluated according to a scholastic method giving a value 0 when the whole layer was removed from the base and a value of 10 when no part thereof was removed from the base and intermediate values for intermediate situations. The wet adhesion was measured by drawing some lines with a pencil point to form an asterisk on the film just taken out from the processing bath and by rubbing on the lines with a finger. Also in this case, the adhesion of the layers was measured according a scholastic method by giving a value of 0 when the layers were totally removed from the base, a value of 10 when no portion thereof was removed and intermediate values for intermediate cases.

VI. ALTERNATE PREPARATION OF VANADIUM OXIDE

To a solution of 2.1 kg of 30 weight percent hydrogen peroxide (18.5 mol, available from EM Science, Gibbstown, N.J.) and about 658 kg of deionized water was added 21.4 kg of vanadium triisobutoxide oxide (74.7 mol, available from AKZG Chemicals, Inc., Chicago, Ill.). The resulting vanadium oxide sol was stirred for two hours at room temperature and then heated to 60° C. at which time the sol was transferred, by pumping, to 210 liter polyethylene lined drums. The vanadium oxide sol was then aged at 60° C. for two days and then allowed to cool at room temperature at which time analysis showed the sol containing colloidal vanadium oxide with equivalency of 1.0 percent.

VII. PREPARATION OF POLYMER DISPERSION (LATEX)—azo initiator

Synthesis of terpoly(vinylidene chloride-methylacrylate-itaconic acid) latex. In a 500 mL glass bottle was added 5.74 grams methyl acrylate (0.067 mol, available from Aldrich Chemical Co., Milwaukee, Wis.), 1.87 grams itaconic acid (0.014 mol, available from Aldrich Chemical Co., Milwaukee, Wis.), 1.1 grams sodium lauryl sulfate (0.0038 mol, available from Aldrich Chemical Co., Milwaukee, Wis.), 0.33 grams Wako V-501 initiator (4,4'-azobis(4-cyano pentanoic acid, 0.0012 mol, available from Wako Chemicals USA, Inc., Richmond, Va.), and 330 grams deionized water. The resulting solution was purged with nitrogen for 10 minutes. Vinylidene chloride (62.4 g, 0.644 mol, available from Aldrich Chemical Co., Milwaukee, Wis.) was then added to the bottle and the bottle was sealed with a teflon lined screw cap. The bottle was then placed in an Atlas Launderometer (available from Atlas Electric Devices Co., Chicago, Ill.) and heated with agitation to 55° C. for 22 hours to give a terpoly(vinylidene chloride-methylacrylate-itaconic acid) latex with 17.5 weight percent solids.

VIII. PREPARATION OF POLYMER DISPERSION (LATEX)—aged

Synthesis of terpoly(vinylidene chloride-methylacrylate-itaconic acid) latex. Into a 100 gallon (379 liter) glass lined reactor was added 104.3 kg of deionized water, 578 grams of sodium lauryl sulfate (Texapon K12, available from Henkel Co., Ambler, Pa.), 179 grams of V-501 initiator (available from Wako Chemicals USA, Inc., Richmond, Va.), 1.04 kg of itaconic acid (available Pfizer, Inc., New York, N.Y., and 3.1 kg of methyl acrylate (available from Hoechst-Celanese Corp., Dallas, Tex.). The reactor was purged by twice pulling vacuum to 250 mm Hg and filled with nitrogen to 0.66 Bar of pressure. The reactor was then evacuated to 250 mm Hg and 34.0 kg of vinylidene chloride (available from Dow Chemical Co., Midland, Mich.) was pumped into the reactor followed by 4.5 kg of deionized water. The contents of the reactor were then heated to 65° C. under agitation for 8 hours. The reactor was then cooled to 29° C. and pulled to 250 mm Hg vacuum and held for 2 hours to remove unreacted monomers. 868 grams of purified Triton X-200 32% aqueous solution (Triton X-200 available from Union Carbide, Danbury, Conn., purified by hexane extraction to remove hexane-soluble fraction) and 36 kg of deionized water were then added. The contents of the reactor were drained through a 50 micron filter cartridge to give a latex of 19.9% solids. The latex dispersion was allowed to age for 170 days at 21° C. before use.

IX. PREPARATION OF POLYMER DISPERSION (LATEX)

Synthesis of terpoly(vinylidene chloride-methylacrylate-itaconic acid) latex. Into a 100 gallon (379 liter) glass lined reactor was added 104.3 kg of deionized water, 578 grams of sodium lauryl sulfate (Texapon K12, available from Henkel Co., Ambler, Pa.), 179 grams of V-501 initiator (available from Wako Chemicals USA, Inc., Richmond, Va.), 1.04 kg of itaconic acid (available Pfizer, Inc., New York, N.Y.), and 3.1 kg of methyl acrylate (available from Hoechst-Celanese Corp., Dallas, Tex.). The reactor was purged by twice pulling vacuum to 250 mm Hg and filled with nitrogen to 0.66 Bar of pressure. The reactor was then evacuated to 250 mm Hg and 34.0 kg of vinylidene chloride (available from Dow Chemical Co., Midland, Mich.) was pumped into the reactor followed by 4.5 kg of deionized water. The contents of the reactor were then heated to 55° C. under agitation for 20 hours. The reactor was then cooled to 29° C. and pulled to 250 mm Hg vacuum and held for 2 hours to remove unreacted monomers. The contents of the reactor were drained through a 50 micron filter cartridge to give a latex of 19.7% solids.

X. PREPARATION OF POLYMER DISPERSION (LATEX)

Preparation of copoly(glycidyl methacrylate-methyl acrylate) latex. Into a 240 mL glass bottle was added 0.53 gram of sodium lauryl sulfate (Texapon K12, available from Henkel Co., Ambler, Pa.), 0.14 grams of V-501 initiator (available from Wako Chemicals USA, Inc., Richmond, Va.), 105 grams deionized water, 26.25 grams of glycidyl methacrylate (available from Sartomer Co., Exton, Pa.) and 8.75 grams of methyl acrylate (available from Hoechst-Celanese Corp., Dallas, Tex.). The contents in the bottle were purged with nitrogen for 2 minutes. The bottle was then sealed with a teflon-lined screw cap, put in a Launder-Ometer and heated to 60° C. for 20 hours. The contents were then cooled to room temperature and filtered through a piece of cheese cloth to give a latex with 23.4% solids.

EXAMPLE 1

An aqueous antistatic formulation comprising 0.025% by weight vanadium oxide prepared as described in Preparation I above, a latex comprising 0.075% by weight of terpolymer of vinylidene chloride, ethyl acrylate and itaconic acid prepared and dialysed as described in Preparation II and Preparation III, and 0.05% by weight Triton™ X-100 (surfactant product of Union Carbide, Danbury, Conn.) was coated onto PVDC (polyvinylidene chloride) primed polyethylene terephthalate film using a number 12 Mayer bar (wet coating thickness equal to about 24 ml/m$^2$) and dried at 100° C. for 5 minutes to obtain an antistatic film (Film 1). The primed layer coated on the film base comprises a terpolymer (PVDC) consisting of vinylidene chloride, ethylacrylate and itaconic acid in a molar ratio of 89.7/8.8/1.5 together with conventional coating aids. The colloidal vanadium oxide to polymer latex dry weight ratio was 1:3.

An aqueous antistatic formulation comprising 0.025% by weight vanadium oxide prepared as described in Preparation I, a latex comprising 0.25% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 2). The colloidal vanadium oxide to polymer dispersion dry weight ratio was 1:10.

An aqueous antistatic formulation comprising 0.025% by weight vanadium oxide prepared as described in Preparation I, a latex comprising 0.50% by weight of dialysed terpolymer (Preparation II), and 0.05% by weight Triton™ X-100 was coated onto PVDC primed polyethylene terephthalate film using a number 12 Mayer bar and dried at 100° C. for 5 minutes to obtain an antistatic film (Film 3). The colloidal vanadium oxide to polymer dispersion dry weight ratio was 1:20.

An aqueous antistatic formulation comprising 0.025% by weight vanadium oxide prepared as described in Preparation I, a latex comprising 0.75% by weight of dialysed terpolymer (Preparation III), and 0.05% by weight Triton™ X-100 was coated onto PVDC primed polyethylene terephthalate film using a number 12 Mayer bar and dried at 100°C. for 5 minutes to obtain an antistatic film (Film 4). The colloidal vanadium oxide to polymer dispersion dry weight ratio was 1:30.

An aqueous antistatic formulation comprising 0.025% by weight vanadium oxide prepared as described in Preparation I, a latex comprising 1.00% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 5). The colloidal vanadium oxide to polymer dispersion dry weight ratio was 1:40.

An aqueous antistatic formulation comprising 0.025% by weight vanadium oxide prepared as described in Preparation I, a latex comprising 1.25% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 6). The colloidal vanadium oxide to polymer dispersion dry weight ratio was 1:50.

An aqueous antistatic formulation comprising 0.025% by weight vanadium oxide prepared as described in Preparation I, a latex comprising 1.50% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 7). The colloidal vanadium oxide to polymer dispersion dry weight ratio was 1:60.

An aqueous antistatic formulation comprising 0.025% by weight vanadium oxide prepared as described in Preparation I, a latex comprising 2.00% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 8). The colloidal vanadium oxide to polymer dispersion dry weight ratio was 1:80.

An aqueous antistatic formulation comprising 0.025% by weight vanadium oxide prepared as described in Preparation I, a latex comprising 2.50% by weight of dialysed terpolymer (Preparation III), and 0.05% by weight Triton™ X-100 was coated onto PVDC primed polyethylene terephthalate film using a number 12 Mayer bar and dried at 100° for 5 minutes to obtain an antistatic film (Film 9). The colloidal vanadium oxide to polymer dispersion dry weight ratio was 1:100.

An aqueous antistatic formulation comprising 0.025% by weight vanadium oxide prepared as described in Preparation I, a latex comprising 3.13% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 10). The colloidal vanadium oxide to polymer dispersion dry weight ratio was 1:125.

An aqueous antistatic formulation comprising 0.025% by weight vanadium oxide prepared as described in Preparation I, a latex comprising 3.75% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 11). The colloidal vanadium oxide to polymer dispersion dry weight ratio was 1:150.

An aqueous antistatic formulation comprising 0.025% by weight vanadium oxide prepared as described in Preparation I, a latex comprising 4.38% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 12). The colloidal vanadium oxide to polymer dispersion dry weight ratio was 1:175.

An aqueous antistatic formulation comprising 0.025% by weight vanadium oxide prepared as described in Preparation I, a latex comprising 5.00% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 13). The colloidal vanadium oxide to polymer dispersion dry weight ratio was 1:200.

An aqueous antistatic formulation comprising 0.025% by weight vanadium oxide prepared as described in Preparation I, a latex comprising 6.25% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 14). The colloidal vanadium oxide to polymer dispersion dry weight ratio was 1:250.

An aqueous antistatic formulation comprising 0.025% by weight vanadium oxide prepared as described above, a latex comprising 7.50% by weight of dialysed terpolymer Preparation III), and 0.05% by weight Triton™ X-100 was coated onto PVDC primed polyethylene terephthalate film using a number 12 Mayer bar and dried at 100° C. for 5 minutes to obtain an antistatic film (Film 15). The colloidal vanadium oxide to polymer dispersion dry weight ratio was 1:300.

An aqueous antistatic formulation comprising 0.025% by weight vanadium oxide prepared as described in Preparation I, a latex comprising 10.00% by weight of dialysed terpolymer (Preparation III), and 0.05% by weight Triton™ X-100 was coated onto PVDC primed polyethylene terephthalate film using a number 12 Mayer bar and dried at 100° C. for 5 minutes to obtain an antistatic film (Film 16). The colloidal vanadium oxide to polymer dispersion dry weight ratio was 1:400.

All of samples 1–16 were overcoated with an antihalo layer comprising a dispersion of 15 g of gelatin, 10 g of 1.99% Acid Green dye aqueous solution, 20 g of 10% Hostapur™ SAS93 aqueous solution, and 22 g of 1% formaldehyde solution in 232 g of water. Samples of films 1–16 were evaluated for adhesion of the antistatic layer to the film base and to the overcoated antihalo layer and for permanence of the antistatic properties after processing in conventional film processing solutions. Adhesion was measured as described before. Permanence of antistatic properties was checked by measuring the surface resistivity (at 25% relative humidity) before and after treatment in the standard type 3M RDC-5 Graphic Arts processing solutions.

The results obtained are reported in Table 1 below:

TABLE 1

| Film | Surface resistivity (ohms/cm$^2$) | |
|---|---|---|
| | Before Processing | After Processing |
| 1 (comp) | $7 \times 10^9$ | $1 \times 10^{14}$ |
| 2 (comp) | $5 \times 10^9$ | $8 \times 10^{15}$ |
| 3 (comp) | $8 \times 10^9$ | $>1 \times 10^{16}$ |
| 4 (inv) | $5 \times 10^9$ | $6 \times 10^{10}$ |
| 5 (inv) | $7 \times 10^9$ | $1 \times 10^{12}$ |
| 6 (inv) | $3 \times 10^{10}$ | $3 \times 10^{10}$ |
| 7 (inv) | $8 \times 10^9$ | $8 \times 10^9$ |
| 8 (inv) | $1 \times 10^{10}$ | $3 \times 10^{10}$ |
| 9 (inv) | $1 \times 10^9$ | $5 \times 10^{10}$ |
| 10 (inv) | $4 \times 10^9$ | $4 \times 10^{10}$ |
| 11 (inv) | $5 \times 10^9$ | $5 \times 10^{10}$ |
| 12 (inv) | $5 \times 10^9$ | $4 \times 10^{10}$ |
| 13 (inv) | $7 \times 10^9$ | $4 \times 10^{10}$ |
| 14 (inv) | $5 \times 10^9$ | $5 \times 10^{10}$ |
| 15 (inv) | $7 \times 10^9$ | $3 \times 10^{10}$ |
| 16 (inv) | $1 \times 10^9$ | $8 \times 10^9$ |

The data of Table 1 show that the films of the present invention, having a single antistatic layer coated onto the polyester film base and a vanadium oxide to polymer dispersion dry weight ratio lower than 1:30, provide excellent antistatic properties and excellent antistatic properties after processing. Adhesion of the antistatic coating to the film base was good for all the films even in the absence of adhesion promoting agents.

EXAMPLE 2

Vanadium oxide colloidal dispersion, prepared as described in Preparation I (0.50 g of 1.0% vanadium oxide dispersion) was diluted with 9.5 g deionized water. To the diluted dispersion, a solution consisting of 2.78 g of undialysed vinylidene chloride terpolymer latex (prepared as described in Preparation II and containing 17.5% polymer), 0.10 g of 10% Triton™ X-100 solution, and 7.1 g of deionized water was added with stirring. The resulting coating solution contained 0.025% by weight vanadium oxide, 2.4% by weight of terpolymer latex, and 0.05% by weight Triton™ X-100. The weight ratio of polymer to vanadium oxide was 96:1. The solution was applied to PVDC primed PET film using a No. 12 Mayer bar at a coverage of about 24 ml/m$^2$ and dried at 100° C. for 5 minutes to obtain an antistatic film (Film 17). An antihalo layer comprising a dispersion of 15 g of gelatin, 10 g of 1.99% Acid Green dye aqueous solution, 20 g of 10% Hostapur™ SAS93 aqueous solution, and 22 g of 1% formaldehyde solution in 232 g of water was coated on the antistatic layer. Adhesion was measured as described before and was found to be good. The dry adhesion before processing was given 10, the wet adhesion after developing was given 4, the wet adhesion after fixing was given 9, and the dry adhesion after processing was given 10. Permanence of antistatic properties was checked by measuring the surface resistivity (at 25% relative humidity) before and after treatment in the standard type 3M RDC-5 Graphic Arts processing solutions. The resistivity of the sample before processing was $5 \times 10^9$ $\Omega$/cm$^2$ (ohms/cm$^2$) and after processing was $3 \times 10^{10}$ $\Omega$/cm$^2$. This Example shows that effective films of the present invention which exhibit both good adhesion and permanence of antistatic properties can be prepared from polymer dispersions which have not been treated by dialysis.

COMPARATIVE EXAMPLE A

Vanadium oxide colloidal dispersion containing 1.0% vanadium oxide was prepared as described in Example 1 of U.S. Pat. No. 4,203,769 (heating temperature of the molten vanadium oxide was 1100° C.). Deionized water (12.6 g) was added to 7.4 g of the 1.0% vanadium oxide dispersion to give a dispersion containing 0.37% by weight vanadium oxide. A 0.30% by weight polymer dispersion was prepared by diluting 0.67 g of the 17.8% vinylidene chloride/methylacrylate/itaconic acid dispersion of Preparation IV with 19.6 g of deionized water. The diluted vanadium oxide dispersion was mixed with the diluted polymer dispersion to give a coating solution. The weight ratio of polymer to vanadium oxide was 0.8:1. The coating solution was applied using a No. 3 Mayer bar (wet coating about 6 ml/m$^2$) to PVDC primed PET film and dried at 100° C. for 5 minutes to give an antistatic film (film 18) with dry coating weight equal to about 20 mg/m$^2$. An antihalo layer comprising a dispersion of 15 g of gelatin, 10 g of 1.99% Acid Green dye aqueous solution, 20 g of 10% Hostapur™ SAS93 aqueous solution, and 22 g of 1% formaldehyde solution in 232 g of water was coated on the antistatic layer. Adhesion was measured as described before and was found to be unsatisfactory. The dry adhesion before processing was given 3, the wet adhesion after developing was given 7, the wet adhesion after fixing was given 9, and the dry adhesion after processing was given 5. Permanence of antistatic properties was checked by measuring the surface resistivity (at 25% relative humidity) before and after treatment in the standard type 3M RDC-5 Graphic Arts processing solutions. The resistivity of the sample before processing was $3 \times 10^{11}$ $\Omega$/cm$^2$ and after processing was $8 \times 10^{14}$ $\Omega$/cm$^2$. This Comparative Example shows that films prepared according to Example 4 of U.S. Pat. No. 4,203,769 and coated on PVDC primed PET do not exhibit permanence of antistatic properties when treated by the 3M RDC-5 Graphic Arts processing solutions.

COMPARATIVE EXAMPLE B

The coating dispersion of Comparative Example A was applied to unprimed PET film using a No. 3 Mayer bar, however, the coated layer exhibited immediate de-wetting. Triton™ X-100 was added to the coating solution at a concentration of 0.30 weight %. The weight ratio of polymer to vanadium oxide was equal to 0.8:1. The coating dispersion was coated onto unprimed PET film using a No. 3 Mayer bar to give a uniform coating with wet coating thickness about 6 ml/m$^2$. The film was dried at 100° C. for 5 minutes to give an antistatic film (film 19) with dry coating weight equal to 20 mg/m$^2$. An antihalo layer comprising a dispersion of 15 g of gelatin, 10 g of 1.99% Acid Green dye aqueous solution, 20 g of 10% Hostapur™ SAS93 aqueous solution, and 22 g of 1% formaldehyde solution in 232 g of water was coated on the antistatic layer. Adhesion was measured as described before and was found to be unsatisfactory. The dry adhesion before processing was given 2, the wet adhesion after developing was given 1, the wet adhesion after fixing was given 1, and the dry adhesion after processing was given 1. Permanence of antistatic properties was checked by measuring the surface resistivity (at 25% relative humidity) before and after treatment in the standard type 3M RDC-5 Graphic Arts processing solutions. The resistivity of the sample before processing was $3 \times 10^{11}$ $\Omega/cm^2$ and after processing was $7 \times 10^{14}$ $\Omega/cm^2$. This Comparative Example shows that films prepared according to Example 4 of U.S. Pat. No. 4,203,769 and coated onto unprimed PET do not exhibit permanence of antistatic properties when treated by the 3M RDC-5 Graphic Arts processing solutions.

COMPARATIVE EXAMPLE C

Vanadium oxide colloidal dispersion containing 1.0% vanadium oxide was prepared as described in Example 1 of U.S. Pat. No. 4,203,769 (heating temperature of the molten vanadium oxide was 1100° C.). Deionized water (12.6 g) was added to 7.4 g of the 1.0% vanadium oxide dispersion to give a dispersion containing 0.37% by weight vanadium oxide. An 1.1% by weight polymer dispersion was prepared by diluting 12.5 g of the 17.8% vinylidene chloride/methylacrylate/itaconic acid dispersion of Preparation IV with 7.5 g of deionized water. When the diluted vanadium oxide dispersion was mixed with the diluted polymer dispersion instant coagulation was observed. The weight ratio of polymer to vanadium oxide in the coagulated mixture was 30:1. This Comparative Example shows that a coating solution prepared as described in Example 4 of U.S. Pat. No. 4,203,769 but containing an amount of the poly(vinylidene chloride/methyl acrylate/itaconic acid) latex as described in Example 4 of U.S. Pat. No. 4,203,769 which would provide protection of the vanadium oxide from developing solution is unstable and exhibits immediate coagulation.

EXAMPLE 3

Vanadium oxide colloidal dispersion containing 1.0% vanadium oxide was prepared as described in Example 1 of U.S. Pat. No. 4,203,769 (heating temperature of the molten vanadium oxide was 1100° C.). Deionized water (9.5 g) was added to 0.5 g of the 1.0% vanadium oxide dispersion to give a dispersion containing 0.05% by weight vanadium oxide. A 5.0% by weight polymer dispersion was prepared by diluting 4.16 g of the 12% dialysed vinylidene chloride/methylacrylate/itaconic acid dispersion of Preparation III with 0.10 g of 10% Triton™ X-100 solution and 5.8 g of deionized water. The polymer dispersion and the vanadium oxide dispersion were mixed to give a coating solution containing 0.025% by weight vanadium oxide, 2.5% by weight polymer, and 0.05% by weight Triton™ X-100. The weight ratio of polymer to vanadium oxide was 100:1. The solution was applied to PVDC primed PET film using a No. 12 Mayer bar at a coverage of 24 ml/m² and dried at 100° C. for 5 minutes to obtain an antistatic film (Film 20). An antihalo layer comprising a dispersion of 15 g of gelatin, 10 g of 1.99% Acid Green dye aqueous solution, 20 g of 10% Hostapur™ SAS93 aqueous solution, and 22 g of 1% formaldehyde solution in 232 g of water was coated on the antistatic layer. Adhesion was measured as described before and was found to be good. The dry adhesion before processing was given 10, the wet adhesion after developing was given 8, the wet adhesion after fixing was given 10, and the dry adhesion after processing was given 9. Permanence of antistatic properties was checked by measuring the surface resistivity (at 25% relative humidity) before and after treatment in the standard type 3M RDC-5 Graphic Arts processing solutions. The resistivity of the sample before processing was $5 \times 10^9$ $\Omega/cm^2$ and after processing was $7 \times 10^9$ $\Omega/cm^2$. This Example shows that effective films of the present invention which exhibit both good adhesion and permanence of antistatic properties can be prepared from vanadium oxide which is prepared according to the process of U.S. Pat. No. 4,203,769 when the polymer dispersion is subjected to a dialysis treatment.

EXAMPLE 4

Ten grams of terpolymer latex (prepared as described in VII) was treated with 0.20 grams 10 weight percent Triton X-100 surfactant and added to 30 grams of colloidal vanadium oxide (as prepared in Preparation VI, 0.10 weight percent) which was rapidly stirring. There was no visual evidence of separation of vanadium oxide. The resulting solution was then coated on to a PVDC primed poly (ethylene terephthalate) film using a No. 6 Mayer bar. The coated polymeric film was then dried in an oven at 100° C. for five minutes to yield a clear film. The static decay time for the coating (decay of a 5000V potential to less than 50V) was measured to be 0.01 seconds on a Static Decay Meter, Model 406C (available from Electro-Tech Systems, Inc., Glenside, Pa.). The stability of the colloidal vanadium oxide terpoly(vinylidene chloride-methylacrylate-itaconic acid): Triton X-100 surfactant was observed for 19 days at room temperature without evidence of separation. The aged mixture was once again coated onto PVDC primed poly (ethylene terephthalate) film utilizing a Number 6 Mayer bar and measured for static decay. The result was that the coated film exhibited a decay of a 5000V potential to less than 50V of 0.01 seconds on a Static Decay Meter, Model 406C (available from Electro-Tech Systems, Inc., Glenside, Pa.).

EXAMPLE 5

After aging for 170 days at 21° C., the vinylidene chloride-methyl acrylate-itaconic acid copolymer latex prepared as described in VIII above had a conductivity of 13 mS/cm and pH of 1.86. Amberlyst A-21 resin (available from Rohm and Haas, Philadelphia, Pa.) was prepared by washing approximately 50 grams of the as received resin with five approximately 100 mL portions of deionized water. 4.0 g of washed ion exchange resin was added to 100 g of stirring vinylidene chloride-methyl acrylate-itaconic acid copolymer latex and the mixture stirred for 5 minutes. After filtering out the ion exchange resin, the vinylidene chloride-methyl acrylate-itaconic acid copolymer latex had conductivity=2.2 mS/cm and pH=2.93. A solution was prepared by adding 77.7 grams of deionized water, 1.0 grams of 10% Triton X-100 surfactant, and 1.35 grams 1% vanadium oxide, prepared as described in VI, to 20.0 grams of ion-exchange treated vinylidene chloride-methyl acrylate-itaconic acid copolymer latex. The solution was stable for over 48 hours. When coated onto PVDC primed polyester film using a number six Mayer bar and dried for 5 minutes at 100° C., the solution provided a coating with surface resistance $=9.9 \times 10^9$ ohms/square and static decay time for 5000V to 50V decay equal to 0.02 seconds. Resistivity was tested on a Keithley 610C Electrometer with Keithley 6105 resistivity adapter and Keithley 247 high voltage power supply (from Keithley Instruments Inc., Cleveland, Ohio).

COMPARATIVE EXAMPLE D

The procedure of EXAMPLE 5 was repeated except that the vinylidene chloride-methyl acrylate-itaconic acid copolymer latex (prepared as described in VIII) was not treated with ion exchange resin before use. A solution was prepared by adding 77.7 grams of deionized water, 1.0 grams of 10% Triton X-100 surfactant, and 1.35 grams of 1% vanadium oxide, prepared as described in VI, to 20.0 grams vinylidene chloride-methyl acrylate-itaconic acid copolymer latex which had not been purified. After six hours, the solution color had faded from brown to light tan or off white. No coagulation of vanadium oxide was observed. The resulting solution was then coated on to PVDC primed poly(ethylene terephthalate) film using a No. 6 Mayer bar. The coated polymeric film was then dried in an oven at 100° C. for five minutes to yield a clear film. The surface resistivity of the coating was $1.0 \times 10^{12}$ ohms/square and the static decay time for the coating (decay of a 5000V potential to less than 50V) was measured to be 8.5 seconds on a Static Decay Meter, Model 406C (available from Electro-Tech Systems, Inc., Glenside, Pa.). After twenty hours, the solution was again coated and tested. The surface resistivity was greater than $1 \times 10^{12}$ ohms/square and the sample did not exhibit static decay.

EXAMPLE 6

Amberlyst A-21 resin (available from Rohm and Haas, Philadelphia, Pa.) was prepared by washing approximately 50 grams of the as received resin with five approximately 100 mL portions of deionized water. The washed resin was added to a solution of 20 grams of glacial acetic acid (available from Mallinckrodt, Paris, Ky.) plus 150 grams of deionized water. The treated resin was separated from the acetic acid solution by filtration and washed with five approximately 100 mL portions of deionized water. 4.0 g of wet, treated and washed ion exchange resin was added to 100 g of stirring vinylidene chloride-methyl acrylate-itaconic acid copolymer latex (prepared as described in VIII) and the mixture was stirred for 5 minutes. After filtering out the ion exchange resin, the vinylidene chloride-methyl acrylate-itaconic acid copolymer latex had conductivity=1.7 mS/cm and pH=3.21. A solution was prepared by adding 77.7 grams of deionized water, 1.0 grams of 10% Triton X-100 surfactant, and 1.35 grams 1% vanadium oxide, prepared as described in VI, to 20.0 grams of ion-exchange treated vinylidene chloride-methyl acrylate-itaconic acid copolymer latex. The solution was stable for over 48 hours. When coated onto PVDC primed polyester film using a number six Mayer bar and dried for 5 minutes at 100° C., the solution provided a coating with surface resistance=$5.9 \times 10^9$ ohms/square and static decay time for 5000V to 50V decay equal to 0.01 seconds. Resistivity was tested on a Keithley 610C Electrometer with Keithley 6105 resistivity adapter and Keithley 247 high voltage power supply (from Keithley Instruments Inc., Cleveland, Ohio).

EXAMPLE 7

The vinylidene chloride-methyl acrylate-itaconic acid copolymer latex prepared as described in VIII after aging for 170 days at 21° C. was purified as described in Example 2 of U.S. Pat. No. 4,002,802 except that the column size was 80 ml and the flow rate was 14 mL/min. The ion exchange treated vinylidene chloride-methyl acrylate-itaconic acid copolymer latex had a pH of 6.36. Malonic acid (0.80 grams of 10% aqueous solution, available from Aldrich Chemical Co., Milwaukee, Wis.) was added to 100.0 grams of ion-exchange treated latex to give an acidified latex with pH equal to 4.03. A coating solution was prepared by adding 6.80 grams of deionized water, 20.0 grams of 0.027% colloidal vanadium oxide, prepared as described in Preparation VI, and 0.4 grams of 10% Triton X-100 surfactant to 12.8 grams of 12.5% ion exchange treated, acidified vinylidene chloride-methyl acrylate-itaconic acid copolymer latex. When coated onto PVDC primed polyester film using a number six Mayer bar and dried for 5 minutes at 100° C., the solution provided a coating with static decay time for 5000V to 50V decay equal to 0.02 seconds and surface resistivity equal to $3.2 \times 10^9$ ohms/square. The stability of the colloidal vanadium oxide: terpoly(vinylidene chloride-methylacrylate-itaconic acid): Triton X-100 surfactant was observed for 2 days at room temperature without evidence of separation. The aged mixture was once again coated onto PVDC primed polyester film utilizing a Number 6 Mayer tested for antistatic properties. The result was that the coated film exhibited a static decay time for 5000V to 50V decay equal to 0.03 seconds a surface resistivity=$3.0 \times 10^9$ ohms/square.

EXAMPLE 8

Amberlite IRC 84 resin (available from Rohm and Haas, Philadelphia, Pa.) was prepared by washing approximately 50 grams of the as received resin with 20 grams of concentrated hydrochloric acid and then five approximately 100 mL portions of deionized water. The washed resin was added to a solution of 15 grams of lithium hydroxide monohydrate plus 150 grams of deionized water. The treated resin was separated from the LiOH solution by filtration and washed with five approximately 100 mL portions of deionized water. 4.0 g of wet, treated and washed ion exchange resin was added to 100 g of stirring vinylidene chloride-methyl acrylate-itaconic acid copolymer latex (prepared as described in VIII) and the mixture was stirred for 5 minutes. After filtering out the ion exchange resin, the vinylidene chloride-methyl acrylate-itaconic acid copolymer latex had conductivity=4.9 mS/cm and pH=3.36. A solution was prepared by adding 77.7 grams of deionized water, 1.0 grams of 10% Triton X-100 surfactant, and 1.35 grams 1% vanadium oxide, prepared as described in VI, to 20.0 grams of ion-exchange treated vinylidene chloride-methyl acrylate-itaconic acid copolymer latex. The solution was stable for over 48 hours. When coated onto PVDC primed polyester film using a number six Mayer bar and dried for 5 minutes at 100° C., the solution provided a coating with surface resistance=$5 \times 10^8$ ohms/square and static decay time for 5000V to 50V decay equal to 0.02 seconds.

EXAMPLE 9

8.19 g of 1.0 weight percent lithium hydroxide was added 100 g of stirring vinylidene chloride-methyl acrylate-itaconic acid copolymer latex (prepared as described in VIII) and the mixture was stirred for 5 minutes. The conductivity of the treated solution was 5.0 mS/cm and the pH was 2.56. To 21.78 grams of the lithium hydroxide treated terpoly (vinylidene chloride-methylacrylate-itaconic acid) latex was added 27.22 grams of deionized water, 50.0 grams of 0.027% colloidal vanadium oxide (prepared as described in VI), and 1.0 grams of 10 weight percent Triton X-100 surfactant. The resulting solution was then coated on to PVDC primed poly(ethylene terephthalate) film using a No. 6 Mayer bar. The coated polymeric film was then dried in an oven at 100° C. for five minutes to yield a clear film. The static decay time for the coating (decay of a 5000V potential to less than 50V) was measured to be 0.04 seconds on a Static Decay Meter, Model 406C. (available from Electro-Tech Systems, Inc., Glenside, Pa.) and the surface resistivity was $2.7 \times 10^9$ ohms/square. The stability of the colloidal vanadium oxide: terpoly(vinylidene chloride-methylacrylate-itaconic acid): Triton X-100 surfactant was observed for 2 days at room temperature without evidence of separation. The aged mixture was once again coated onto PVDC primed polyester film utilizing a Number 6 Mayer tested for antistatic properties. The result was that the coated film exhibited a static decay time for 5000V to 50V decay equal to 0.02 seconds a surface resistivity=1.3×10⁹ ohms/square.

EXAMPLE 10

Copoly(glycidyl methacrylate-methyl acrylate) latex (4.0 grams of 23.4% latex, prepared as described in X) was added to 36.0 grams of 19.7% of terpoly(vinylidene chloride-methylacrylate-itaconic acid) latex prepared as described in IX above. The conductivity of the terpoly(vinylidene chloride-methylacrylate-itaconic acid) latex was 4.4 mS/cm and the conductivity of the terpoly(vinylidene chloride-methylacrylate-itaconic acid)/copoly(glycidyl methacrylate-methyl acrylate) latex mixture was 3.6 mS/cm. After aging for 67 days at 21° C., the conductivity of the terpoly (vinylidene chloride-methylacrylate-itaconic acid) latex had increased to 6.5 mS/cm and the pH was 2.03 while conductivity of the terpoly(vinylidene chloride-methylacrylate-itaconic acid)/copoly(glycidyl methacrylate-methyl acrylate) latex mixture had risen to 4.9 mS/cm and the pH was 2.16. To 8.00 grams of the terpoly(vinylidene chloride-methylacrylate-itaconic acid)/copoly(glycidyl methacrylate-methyl acrylate) latex mixture was added 11.6 grams of deionized water, 20.0 grams of 0.027% colloidal vanadium oxide (Preparation VI), and 0.40 grams of 10 weight percent Triton X-100 surfactant. The resulting solution was then coated on to PVDC primed poly(ethylene terephthalate) film using a No. 6 Mayer bar. The coated polymeric film was then dried in an oven at 100° C. for five minutes to yield a clear film. The static decay time for the coating (decay of a 5000V potential to less than 50V) was measured to be 0.05 seconds on a Static Decay Meter, Model 406C (available from Electro-Tech Systems, Inc., Glenside, Pa.) and the surface resistivity was 2.6×10⁹ ohms/square. The stability of the colloidal vanadium oxide: terpoly(vinylidene chloride-methylacrylate-itaconic acid): copoly(glycidyl methacrylate-methyl acrylate): Triton X-100 surfactant solution was observed for 2 days at room temperature without evidence of separation. The aged mixture was once again coated onto PVDC primed polyester film utilizing a Number 6 Mayer tested for antistatic properties. The result was that the coated film exhibited a static decay time for 5000V to 50V decay equal to 0.04 seconds a surface resistivity=4.0×10⁹ ohms/square.

What is claimed is:

1. A photographic element consisting essentially of a substrate, an antistatic layer coated on the substrate wherein the antistatic layer comprises a vinyl addition polymer and vanadium oxide, wherein the weight ratio of vanadium oxide to vinyl addition polymer is in the range from 1:30 to 1:500, and at least one silver halide emulsion layer.

2. The photographic element of claim 1 wherein said vinyl addition polymer is a terpolymer comprising from 35 to 96% by mole vinylidene chloride, from 3.5 to 64.5% by mole of an ethylenically unsaturated ester and from 0.5 to 25% by mole of a compound selected from the group consisting of itaconic acid, the half-methyl ester of itaconic acid, acrylic acid, and methacrylic acid.

3. The photographic element of claim 1 wherein the antistatic layer is located between the substrate and the emulsion layer and there is a thin gelatin layer between the antistatic layer and the emulsion layer.

4. A photographic element consisting essentially of a substrate, an antistatic layer coated on the substrate wherein the antistatic layer comprises a vinyl addition polymer and vanadium oxide comprising particles of vanadium oxide having a thickness in the range of from 0.02 to 0.08 μm and a length up to 4 μm, wherein the weight ratio of vanadium oxide to vinyl polymer is in the range from 1:30 to 1:500, at least one silver halide emulsion layer, and one or more auxiliary layers which are not barrier layers.

5. The element of claim 4 wherein the auxiliary layer is selected from the group consisting of backing layers, anti-scratching layers, anticurling layers, slipping layers, backing gelatin antihalation layers, thin gelatin layers interposed between the antistatic layer and another gelatin containing layer, and magnetic recording layers.

* * * * *